F. P. FOWLER.
Attachment for Harness.

No. 229,111. Patented June 22, 1880.

WITNESSES
H. P. Jones
Fred N. Lang

INVENTOR
Frank P. Fowler

UNITED STATES PATENT OFFICE.

FRANK P. FOWLER, OF BARABOO, WISCONSIN.

ATTACHMENT FOR HARNESS.

SPECIFICATION forming part of Letters Patent No. 229,111, dated June 22, 1880.

Application filed August 23, 1879.

*To all whom it may concern:*

Be it known that I, FRANK P. FOWLER, of Baraboo, in the county of Sauk, State of Wisconsin, have invented a new and useful Attachment for Harnesses, which attachment is fully described in the following specification, reference being had to the accompanying drawings, of which—

Figure 1:
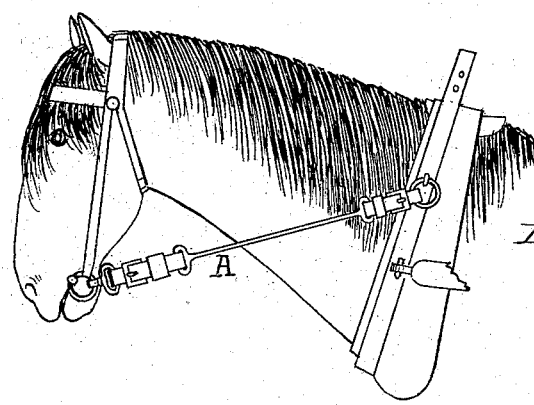
Figure 2:
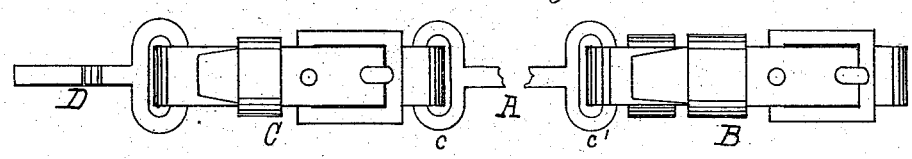
Figure 3:
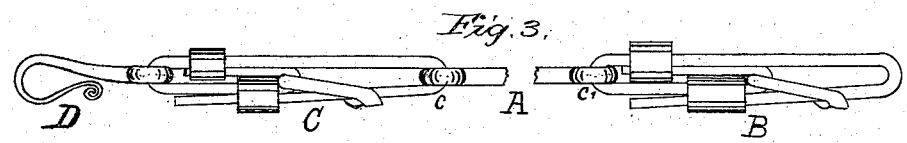

Figure 1 is a view of the device attached for use. Fig. 2 is a view of the same detached; Fig. 3, an edge view of the same.

By attaching this device to the harness of a horse he will be prevented from biting the reins, blankets, or the horse attached with him, also from putting his head to the ground under the lines, or over the neck of the other horse, and it will cause him to stand quietly while hitched.

The device is formed of a rod having a loop at each end, two straps with buckles and loops, and a spring-hook, which are combined and used for the above purposes.

A is a rod of steel, brass, or other suitable material, the ends of which are formed into loops $c\ c'$. Through the loops $c\ c'$ are passed the straps B and C, having the buckles and loops necessary for their proper adjustment. The spring-hook D is attached to strap C. This forms the device, and its use is as follows: The strap B is buckled into the ring (on the hame) through which the rein or line passes. The hook D is then hooked into the bit. When not in use the hook D is unhooked and the device is allowed to hang from the ring on hame.

What I claim as my invention, and desire to secure by Letters Patent, is—

The combination of the arm A, having a loop at each end, made of steel, brass, or other suitable material, with the leather straps B C, substantially as shown, and the attached hook D, as described, and for the purpose specified.

FRANK P. FOWLER.

In presence of—
FRED. N. LANG,
J. VAN ORDEN.